Nov. 4, 1952        A. V. ALSTON        2,616,745
FISHERMAN'S GRIPPING DEVICE
Filed Aug. 23, 1947

INVENTOR
Albert V. Alston
by
ATTORNEYS

Patented Nov. 4, 1952

2,616,745

UNITED STATES PATENT OFFICE 2,616,745

FISHERMAN'S GRIPPING DEVICE

Albert V. Alston, Albany, N. Y.

Application August 23, 1947, Serial No. 770,292

2 Claims. (Cl. 294—25)

My invention relates to equipment for fishermen and more particularly to a mitt for gripping a fish or the like.

Fish, particularly large fish having sharp fins and teeth, are very difficult to hold with the bare hand without danger of injury while removing the hook therefrom or while cleaning and emptying a boat well in which said fish are alive.

The principal object of my invention is to provide a mitt adapted to be slipped over the hand and which is provided on the palm and palm side of the thumb thereof with gripping means adapted firmly to engage and hold fish, eels, lobsters and the like when gripped thereby.

I accomplish this object by means of the novel mitt described below and illustrated in the accompanying drawing in which —

Referring to the drawing—

Figure 1:
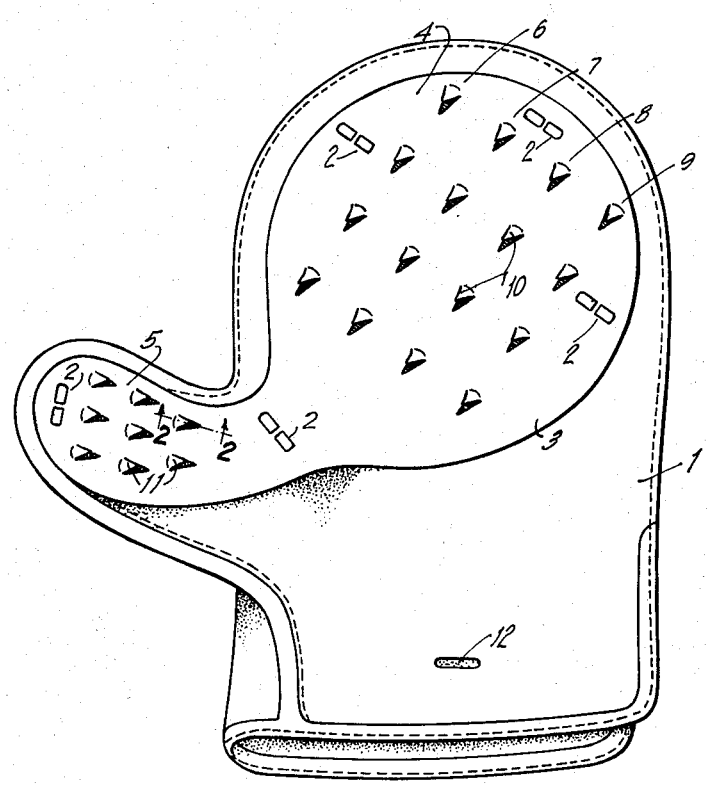
Fig. 1 is a plan view of the palm side of the mitt.
Figure 2:
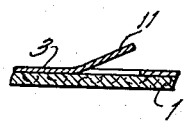
Fig. 2 is an enlarged, fragmentary section of Fig. 1 in the plane 2—2.

My device comprises a conventional canvas or leather mitt 1, to the palm and the palm side of the thumb of which is secured, by means of rivets 2, a thin, flexible, metal sheet or strip 3, preferably of steel. In general, the strip may be said to be roughly U-shaped in plan, but one branch 4 of the U which is adapted to overlie the palm and finger-covering portion of the mitt is comparatively large and approximately circular in form while the other branch 5, which is adapted to overlie the palm side of the thumb, is oval in shape and substantially smaller than the branch 4.

As illustrated, the branch 4 is provided with four, parallel disposed rows 6, 7, 8 and 9, of sharp-pointed, struck-out portions 10 which are adapted to penetrate the flesh of the fish held thereby. In general, the struck-out portions in the branch 4 point toward the thumb while the struck-out portions 11 in the branch 5 which overlies the thumb point towards the palm of the mitt. In other words, the points in the branch 4 and the points in the branch 5 are in approximately opposed relation to each other.

It is to be understood that the steel plate 3 is very thin and is sufficiently flexible to permit the thumb to be overfolded on the palm so that the fish is grasped between the thumb and the palm, and the points 10 and 11 penetrate the flesh of the fish on opposite sides thereof. However, it will be noted that the zone of the metal strip or facing which connects the branches 4 and 5, and which is at the base of the thumb, is comparatively narrow to make the facing particularly flexible in this zone.

12 is a hole in the mitt for attaching a cord thereto.

In addition to forming a positive gripping means for holding the fish while removing the hook, the mitt may be used in lieu of a landing net or gaff hook in landing a fish.

What I claim is:

1. A fish gripping device comprising a mitt, including portions forming coverings for the palm of the hand and palm sides of the thumb and fingers, and a facing attached thereto provided by a single blank of flexible metal, substantially U-shaped in configuration, one branch of the U overlying the palm and finger-covering portion of the mitt being comparatively large and approximately circular in form, the other branch overlying the palm side of the thumb being approximately oval in shape and smaller than said first branch, said branches having sharp, pointed substantially oppositely-disposed struck-out portions adapted to engage and firmly hold a fish when gripped therebetween, and the base of the U connecting said branches being comparatively narrow to enhance the flexibility characteristics of said blank to grip a fish, and sufficient to permit the branches automatically to be restored to normal position and to disengage struck-out portions from said fish when said grip is released.

2. A fish gripping device comprising a mitt, including portions forming coverings for the palm of the hand and the palm sides of the fingers and thumb, a facing of thin sheet metal provided with a plurality of sharp struck-out portions on that portion of said mitt forming the covering for the palm side of the thumb, and a facing of thin sheet metal provided with a plurality of sharp struck-out portions on that portion of said mitt forming the covering for the palm side of the fingers, said facings being integral with each other and having a flexible zone of comparatively narrow width therebetween, and said metal strip being attached to said hand covering.

ALBERT V. ALSTON.

REFERENCES CITED

The following references are of record in the file of this patent:

UNITED STATES PATENTS

| Number | Name | Date |
| --- | --- | --- |
| 126,474 | Meyn | May 7, 1872 |
| 183,375 | Cutliff | Oct. 17, 1876 |
| 237,524 | Haight et al. | Feb. 8, 1881 |
| 730,051 | Scott | June 2, 1903 |
| 1,314,096 | Ross | Aug. 26, 1919 |
| 1,423,543 | Sautter | July 25, 1922 |
| 1,902,453 | Kaiser | Mar. 21, 1933 |